United States Patent [19]

Machemer et al.

[11] Patent Number: 5,513,173
[45] Date of Patent: Apr. 30, 1996

[54] DATA LINK ACCESS UNIT FOR T1 SPANS SUPPORTING THE EXTENDED SUPERFRAME FORMAT (ESF)

[75] Inventors: Kevin S. Machemer, Littleton; John A. Neely, Aurora, both of Colo.

[73] Assignee: XEL Communications, Inc., Aurora, Colo.

[21] Appl. No.: 213,567

[22] Filed: Mar. 16, 1994

[51] Int. Cl.⁶ .............................. H04J 3/14; H04L 12/26
[52] U.S. Cl. .................................... 370/17; 370/110.1
[58] Field of Search ................................ 370/55, 79, 82, 370/110.1, 100.1, 105.1, 105.2, 13, 17; 379/399, 22, 23; 395/184.01

[56] References Cited

U.S. PATENT DOCUMENTS

| Re. 33,900 | 4/1992 | Howson | 370/105.1 |
|---|---|---|---|
| 4,316,284 | 2/1982 | Howson | 370/105 |
| 4,507,780 | 3/1985 | Perry | 370/105.1 |
| 4,797,654 | 1/1989 | Young et al. | 370/58.1 |
| 5,063,564 | 11/1991 | Crandall et al. | 370/110.1 |
| 5,224,108 | 6/1993 | McDysan et al. | 370/110.1 |
| 5,347,576 | 9/1994 | Taylor | 379/399 |

*Primary Examiner*—Wellington Chin
*Assistant Examiner*—Chau T. Nguyen
*Attorney, Agent, or Firm*—Dorr, Carson, Sloan & Birney

[57] ABSTRACT

A data link access unit for insertion into a T1 span supporting the extended superframe (ESF) format includes an interface for accessing the frames of digital data carried by the T1 span in ESF format (including the data link bits) and calculating performance monitoring data for the T1 span. The interface is controlled by a processor that can access this performance monitoring data and also communicate message data over the data link channel via the interface. Additionally, the unit can provide an ESF/SF interface when inserted into a T1 span between a first channel bank supporting ESF and a second channel bank that does not support ESF.

13 Claims, 8 Drawing Sheets

Fig. 5
(Prior Art)

| ESF Frame Number | ESF Bit Number | F-Bit Assignment | | |
| --- | --- | --- | --- | --- |
| | | Framing Pattern Sequence | Data Link | CRC |
| 1 | 0 | — | m | — |
| 2 | 193 | — | — | CB1 |
| 3 | 386 | — | m | — |
| 4 | 579 | 0 | — | — |
| 5 | 772 | — | m | — |
| 6 | 965 | — | — | CB2 |
| 7 | 1158 | — | m | — |
| 8 | 1351 | 0 | — | — |
| 9 | 1544 | — | m | — |
| 10 | 1737 | — | — | CB3 |
| 11 | 1930 | — | m | — |
| 12 | 2123 | 1 | — | — |
| 13 | 2316 | — | m | — |
| 14 | 2509 | — | — | CB4 |
| 15 | 2702 | — | m | — |
| 16 | 2895 | 0 | — | — |
| 17 | 3088 | — | m | — |
| 18 | 3281 | — | — | CB5 |
| 19 | 3474 | — | m | — |
| 20 | 3667 | 1 | — | — |
| 21 | 3860 | — | m | — |
| 22 | 4053 | — | — | CB6 |
| 23 | 4246 | — | m | — |
| 24 | 4439 | 1 | — | — |

DATA LINK ACCESS UNIT FOR T1 SPANS SUPPORTING THE EXTENDED SUPERFRAME FORMAT (ESF)

BACKGROUND OF THE INVENTION

1. Field of the Invention

The present invention relates generally to the field of telephone communications. More specifically, the present invention discloses a repeater unit for accessing the data link provided in T1 spans supporting the ESF format.

2. Statement of the Problem

T1 spans have been widely used in this country for many years to provide digital telephone communications between channel banks. When a T1 line is used as an interoffice transmission link the operating telephone companies have access to both ends of the line for maintenance and performance monitoring. Furthermore, most installations include protection switching facilities that can also be used to routinely test a line while the traffic assigned to that line is diverted to a spare line. A problem arises when a T1 line is used by a customer as access to the public switched network, as a leased line in a private network, or to interconnect between two adjacent operating telephone companies. The recent rapid growth in use of T1 lines in such applications has created the need for enhanced maintenance and performance monitoring features for T1 customers. The extended superframe (ESF) format as provided in the D5 channel bank (produced by AT&T) addresses many of these features.

Customers should be able to nonintrusively monitor end-to-end performance of the T1 circuit. Monitoring bipolar violations at the customer service unit (CSU) provides nonintrusive monitoring of the received signal, but provides no information regarding the quality of the signal received at the other end of the line. Furthermore, leased T1 circuits generally involve intermediate transmission, multiplexing, and cross-connect equipment. Because the interfaces of this equipment remove bipolar violations, the customer has no performance statistics internal to the provider's facilities. Determination of end-to-end error rate performance in this environment requires taking at least a portion of the T1 circuit out of service.

ESF allows customers to achieve end-to-end performance monitoring while the link is in service by redefining the 8-kbps F bit in each frame to consist of a 2-kbps framing channel, a 4-kbps data link channel, and a 2-kbps CRC (cyclic redundancy check) channel representing a check sum over all information bits. The ESF format is shown in greater detail in FIGS. 5 and 6. The data link supports numerous services, one of which is the ability to interrogate the far end, or any intermediate equipment, for performance statistics. Thus, the data link provides both the customer and the provider with a very useful tool for isolating faulty span lines or equipment. As shown in FIG. 5, the three subchannels are established by "extending" the superframe format to encompass 24 DS1 frames. Because the actual framing bits occur only once every four frames, there are 771 bits intervening between bits carrying the frame pattern sequence (001011). The six CRC bits of each extended superframe provide a cyclic redundancy check of all 4608 information bits in the previous superframe. Besides providing end-to-end performance monitoring, the CRC virtually precludes the chances of false framing on a data bit position. Even though static user data can possibly simulate the framing pattern sequence, it is extremely unlikely that user data can spuriously generate valid CRC codes in successive superframes.

The performance parameters typically measured and reported by the 4-kbps data link are framing bit errors, CRC errors, severely errored framing (SEF) events, line code violations, and controlled slip events. Individual events are reported as well as event summaries. Examples of performance summaries reported are:

(a) Errored seconds (ES).

(b) Severely errored seconds (SES→319 ES's).

(c) Controlled slip seconds (d) Unavailable seconds.

Customer service units supporting ESF typically determine the above parameters on 15 minute intervals and store them for up to 24 hours for polling by a controller. In addition to supporting remote interrogation of performance statistics, the data link can be used to carry alarm information, loopback commands, and protection switching commands.

There is presently a need for a unit that can be readily inserted into a T1 span to access the ESF data link for performance monitoring and communications. In addition, ESF has not been universally adopted in the telecommunications industry. As a result, there are many situations in which it is necessary to provide an ESF/SF interface where a channel bank at one end of the T1 span supports ESF and the channel bank at the other end does not. This can occur between adjacent telephone operating companies or over a leased T1 circuit between a customer service unit supporting ESF and a channel bank that does not support ESF. In such cases, there is a need for an ESF/SF interface unit that can be inserted in the T1 span to provide performance monitoring for that portion of the T1 span between the interface unit and the channel bank that is ESF compatible.

3. Solution to the Problem

The present invention addresses these shortcomings by providing a drop-in unit that can be inserted into a T1 span to access the ESF data link either for the purpose of performance monitoring or communications in addition, the present invention can serve as an ESF/SF interface where the channel bank at one end of the T1 span supports ESF and the channel bank at the other end does not.

SUMMARY OF THE INVENTION

This invention provides a data link access unit for insertion into a T1 span supporting the extended superframe (ESF) format. The unit includes an interface for accessing the frames of digital data carried by the T1 span in ESF format (including the data link bits) and calculating performance monitoring data for the T1 span. The interface is controlled by a processor that can access this performance monitoring data and also communicate message data over the data link channel via the interface. Additionally, the unit can provide an ESF/SF interface when inserted into a T1 span between a first channel bank supporting ESF and a second channel bank that does not support ESF.

A primary object of the present invention is to provide a unit that can be readily inserted into a T1 span to generate performance monitoring information for the T1 span and communicate this information either locally or over the data link channel.

Another object of the present invention is to provide a data link access unit that provides communication of message data over the data link channel.

Yet another object of the present invention is to provide a unit that provides an ESF/SF interface between a first channel bank supporting ESF and a second channel bank that does not.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 5 is a chart showing the ESF channel format.

DETAILED DESCRIPTION OF THE INVENTION

Figure 1:
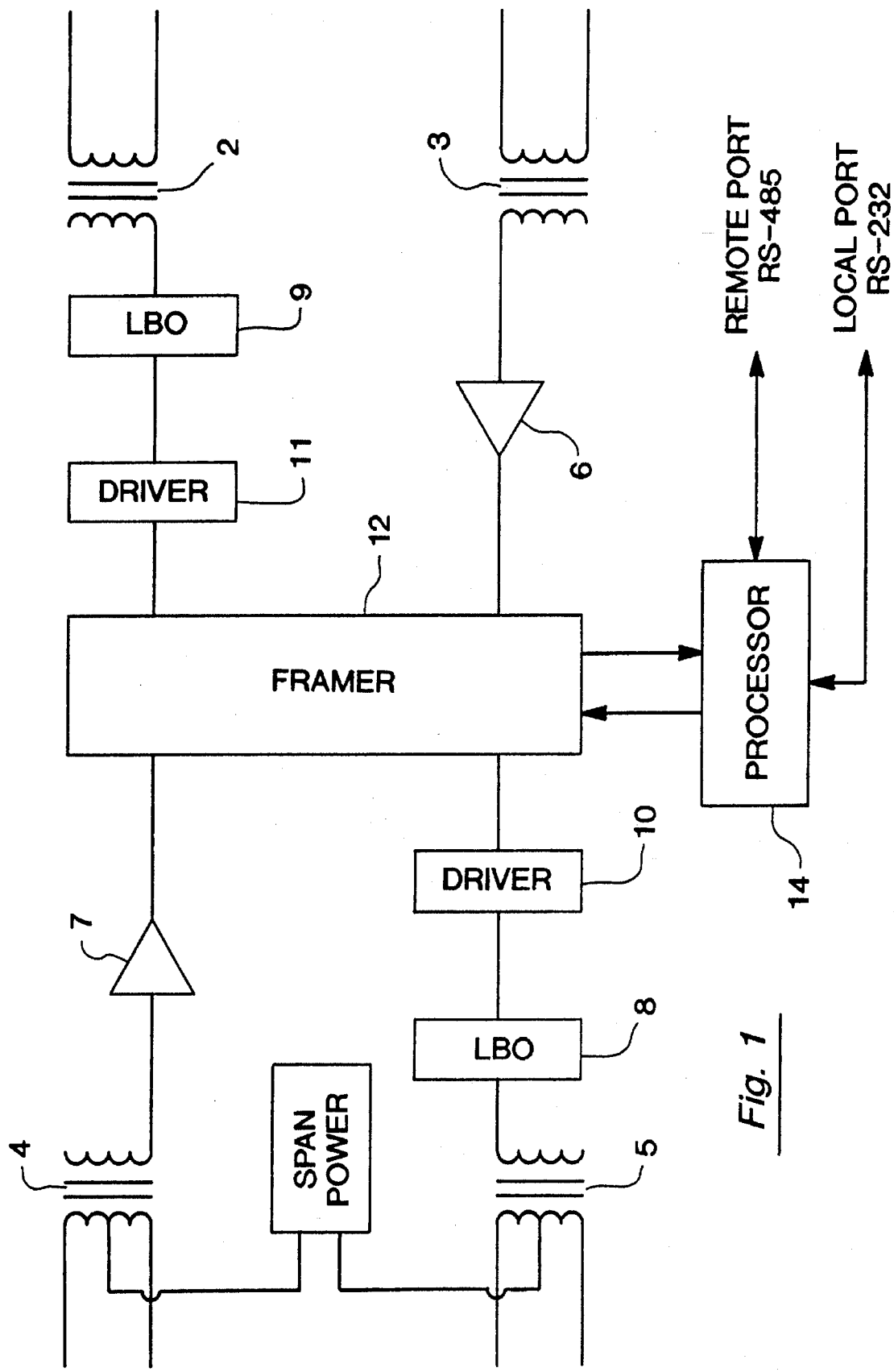
FIG. 1 is a schematic block diagram of the data link access unit of the present invention.

Turning to FIG. 1, a schematic block diagram is provided of the present data link access unit, or DLAU. The data link access unit 20 includes a framer 12 which serves as a means for interfacing with the T1 span. For example, a BtT9170 intelligent T1 controller can be used in combination with a line interface unit (LIU). These semiconductor chips are marketed by Brooktree Corporation (9950 Barnes Canyon Road, San Diego, Calif.). Alternatively, equivalent framers from other vendors could be employed. The framer 12 is controlled by a processor 14, such as one of the 68xx family of microprocessors produced by Motorola Corporation. The framer 12 is inserted into the T1 span as illustrated in FIG. 1. Transformers 2, 3, 4, and 5 provide isolation for the DLAU. The receive signal level is set by amplifiers 6 and 7. The transmit signal levels on both segments of the T1 span on either side of the DLAU are set by corresponding drivers 10 and 11 and buffers 8 and 9.

Figure 7A:
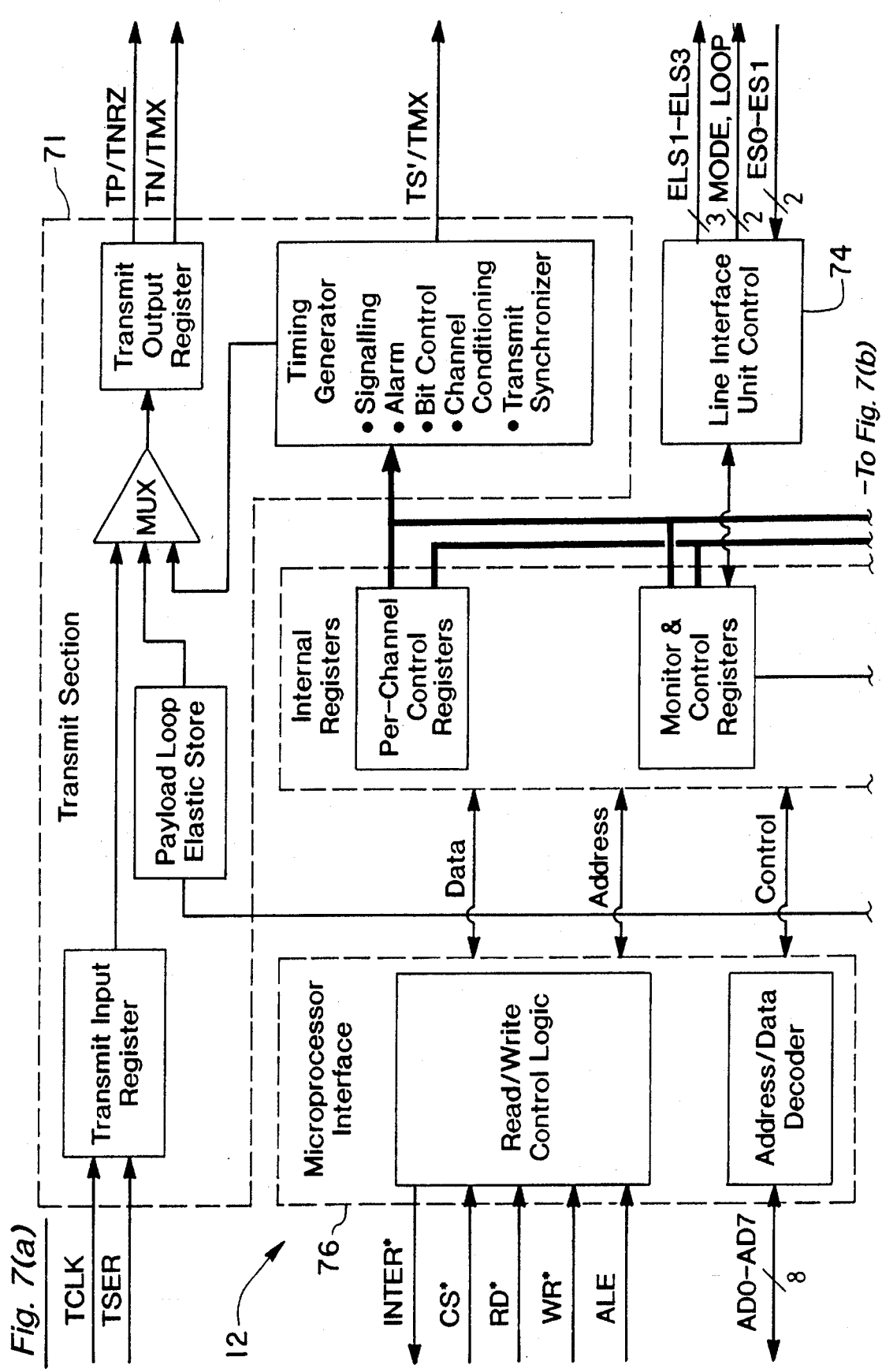
FIGS. 7(a) and 7(b) are block diagrams of a BtT9170 intelligent T1 controller used as the framer 12 in the present invention.
Figure 7B:
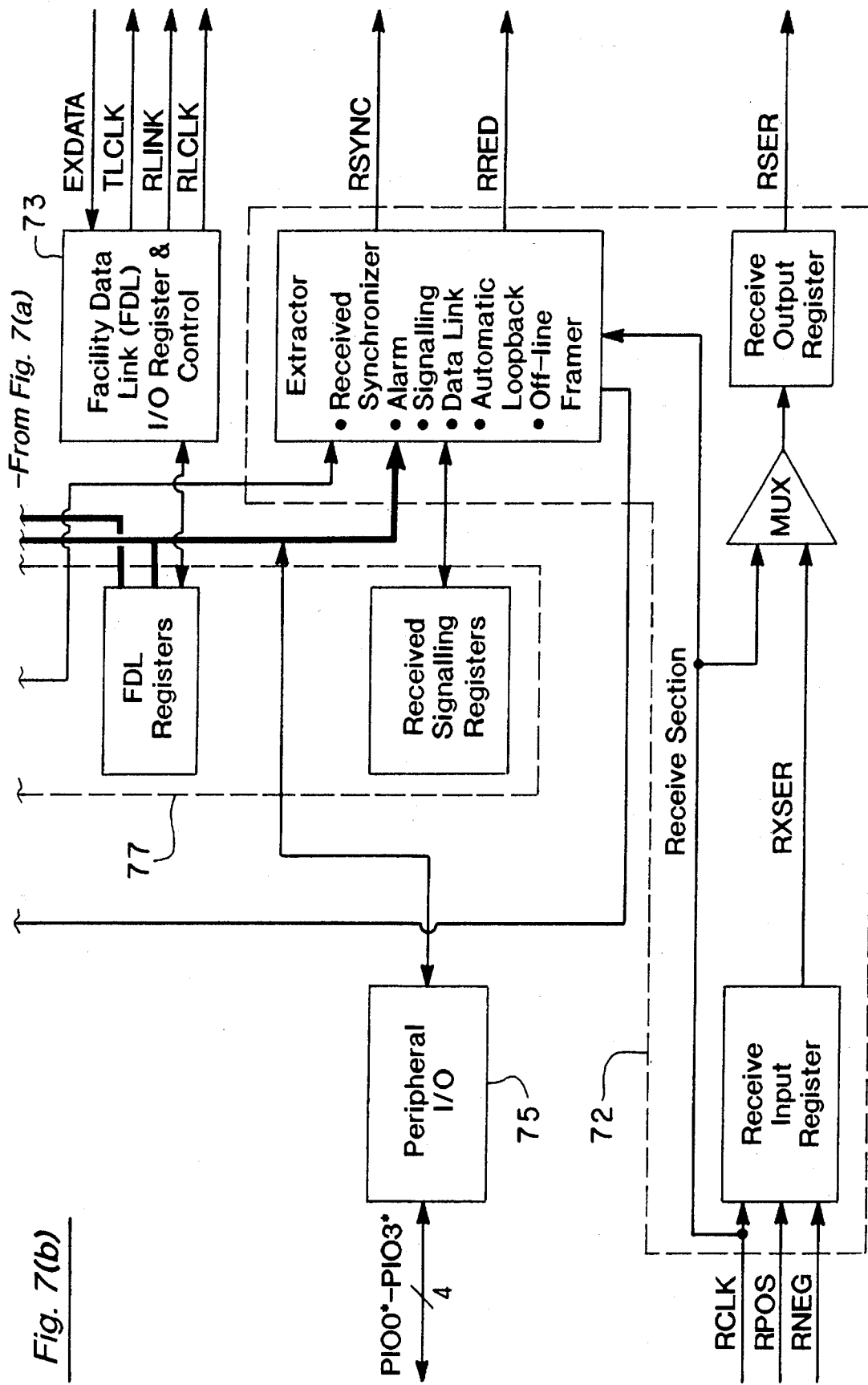

FIGS. 7(a) and 7(b) provide block diagrams of the BtT9170 intelligent T1 controller employed as the framer 12. The transmit section 71 provides the transmitter synchronization, frame/multiframe data formatting, transmit signalling, and yellow-alarm transmission functions. The serial T1 data to be transmitted enters the framer at the TSER input pin. The transmit frame/multiframe timing generator provides both data pattern and timing for frame and multiframe alignment, CRC bits, signalling, facility data link, and yellow alarm. These bits are sent to the transmit multiplexer, where they are used to format the raw data stream into the appropriate T1 format according to the selected mode of operation. Frame and multiframe counters in the transmit frame/multiframe timing generator generate the timing and framing bits. The transmit multiplexer inserts the appropriate F-bit into the transmit data stream. In SF mode, the transmit multiplexer inserts Ft and Fs bits into the serial T1 data stream. In ESF mode, the transmit multiplexer takes data generated by the transmit frame/multiframe generator and inserts the appropriate FPS, CRC-6, and FDL bits.

The receive section 72 is shown in FIG. 7(b). T1 data from the LIU enters on the RPOS and RNEG pins. Incoming data is first decoded and checked for bipolar violations. Bipolar violations are counted and reported to the processor 14 via the near-end monitor registers. The receive extractor extracts specific information from the bit stream of the receiver input register. This data, including the FDL information, is then placed into the appropriate internal registers for the processor 14 to access.

The facility data link (FDL) is generated and decoded by the facility data link section 73 shown in FIG. 7(b). The incoming FDL data is extracted from the incoming bit stream and is placed into the internal registers where it can then be accessed by the processor 14. Outgoing FDL data is either generated internally (e.g., performance reports) or introduced through the external EXDATA input, depending upon the state of the internal control registers set by the processor 14. For example, if the BtT9170 controller is employed, the source of FDL data is determined by the LBYPASS bit in control register 5. This FDL data is merged into the transmit output by the transmit multiplexer in the transmit section 71, which determines when the FDL bits are to be inserted into the T1 bit stream. FDL data that is received by the FDL section 73 of the framer 12 is passed to the RLINK output where it can be accessed by the processor 14.

The line interface unit (LIU) control section 74 allows the BtT9170 to interface directly with and control a line interface unit. Transmit paired unipolar output data from output pins TP/TNRZ and TN/TMX connect directly to LIU input pins TPOS and TNEG, respectively. Conversely, receive input data from the LIU output pins RPOS and RNEG connect directly to the input pins RPOS and RNEG. The processor 14 can also control the LIU and monitor its status by means of internal registers in the BtT9170 controller. The control lines to the LIU select the line equalization (ELS1–ELS3) and the master/slave (MODE) and loopback (LOOP) modes of the LIU. Two status lines (ES0–ES1) communicate the status of the LIU.

The processor 14 uses a memory-mapped bus interface 76, as shown in FIG. 7(a), to control the BtT9170. Direct processor access to the T1 control and monitor functions in the framer's register map allows software access without complicated serial message protocols. The processor 14 also allows a great deal of flexibility in designing a user-friendly interface and facilitating different ways in which the performance data can be accessed or downloaded. The address and data are accessed through pins AD0–AD7 on the BtT9170 shown in FIG. 7(a). The internal registers can be generalized into the following functional categories: control and monitor register array; per-channel control register array; received signalling registers; and performance registers.

The preferred embodiment envisions two alternative means for accessing the performance data retrieved by the processor—a local access mode and a remote access mode. The local access scheme consists of an RS-232 port associated with the processor to allow connection with a handheld terminal or laptop personal computer. The internal registers in the framer 12 tabulate the performance monitoring data, as previously described. The processor 14 retrieves and processes this information, presents the data to the terminal or PC through the RS-232 interface, and the PC then presents the results in a user-friendly screen format.

The remote access scheme ties the DLAU via an RS-485 interface to a data collection bridge (e.g., an X-NET system), which feeds the information back to a remote system controller. For example, a PC located at a remote location can be employed as a system controller to accept information from many DLAU's through multiple ports of an X-NET system. For example, one system controller could accept data from up to 1024 DLAU's by using up to four X-NET systems.

The present unit can also be used for communication of message data over the ESF data link channel. Either the local access scheme or remote access scheme can also be used to facilitate two-way communication of message data over the ESF data link. The system controller transmits message data through the RS-232 port (or over the X-NET system and through RS-485 port in the case of a remote access scheme) to the processor 14. The processor downloads the data to the framer 12 via the memory-mapped bus interface, and directs the framer to encode and transmit the data in the ESF data link channel. Similarly, the framer 12 can extract data that has been encoded in the data link and upload this data to the controller 14. This message data can then be forwarded through the processor port to the system controller or an external terminal.

Figure 2:
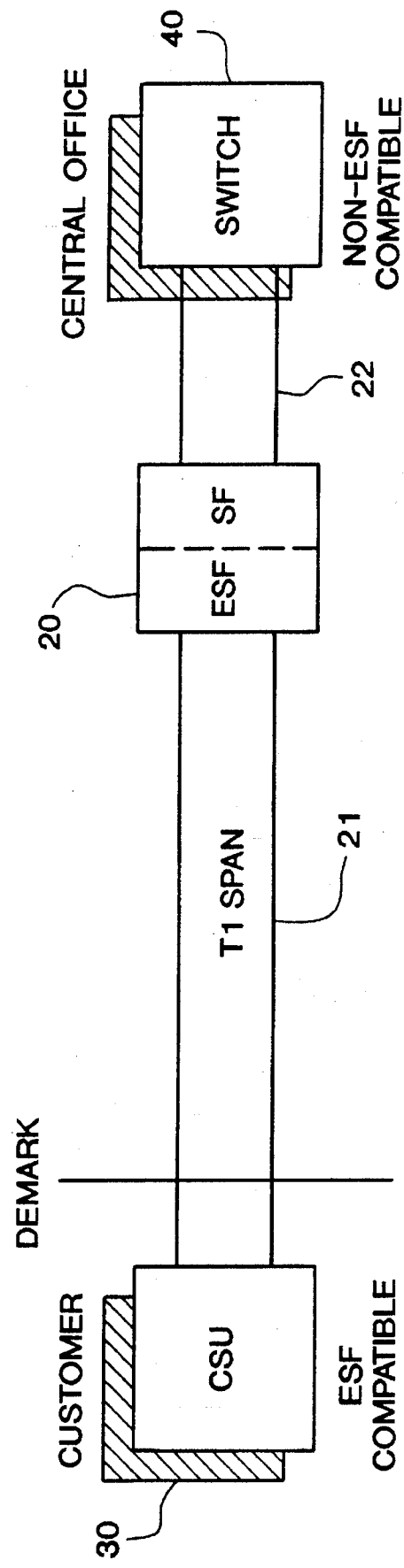
FIG. 2 is a schematic block diagram showing the data link access unit inserted into a T1 span between a customer facility supporting ESF and a central office switch that is not ESF compatible.
Figure 4:
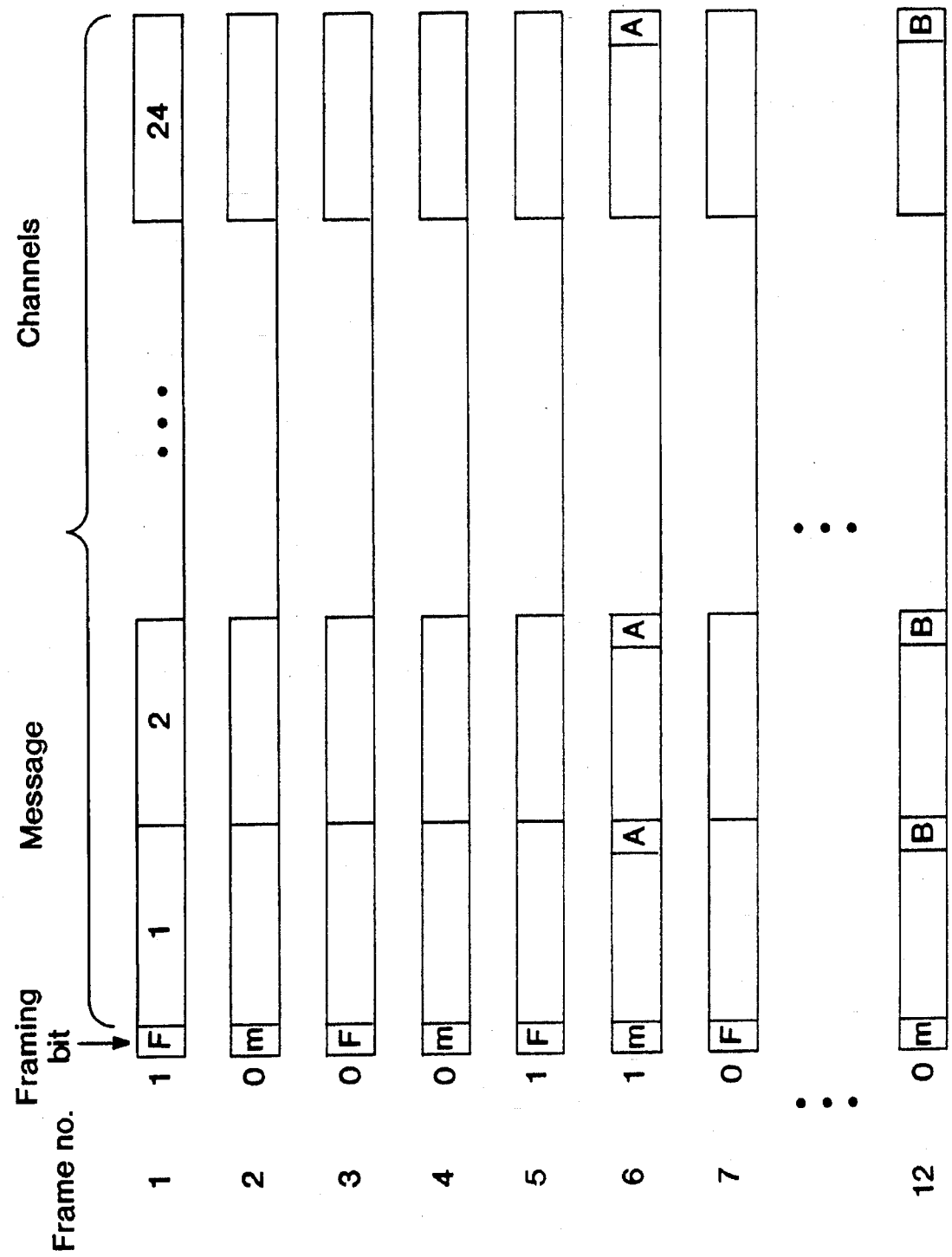
FIG. 4 is a diagram showing a twelve-frame superframe sequence.
Figure 6:
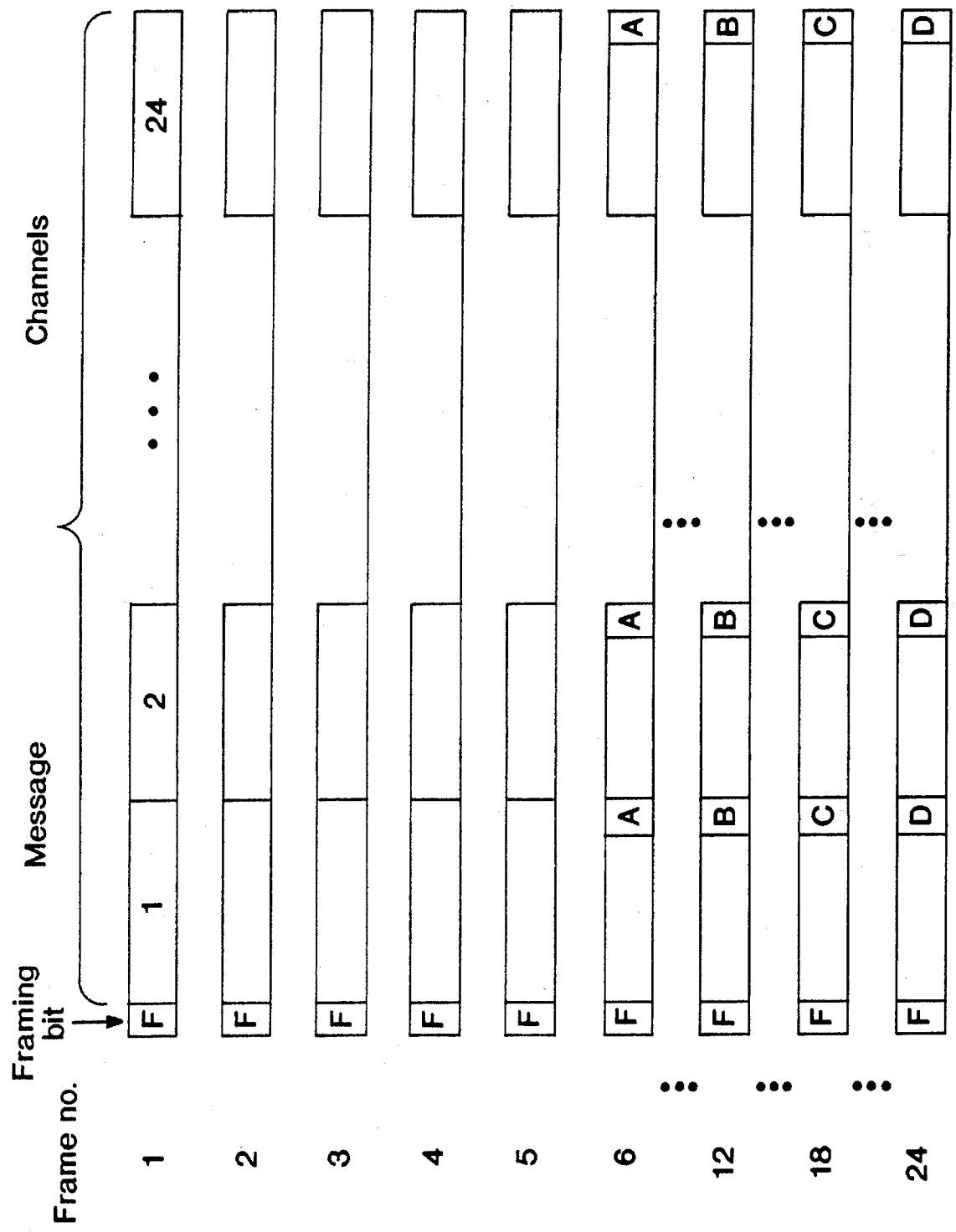
FIG. 6 is a diagram showing a 24-frame ESF sequence.

FIG. 2 shows an example of a typical installation of the data link access unit 20 in a T1 span 21 between a customer supplied unit (CSU) 30 that is ESF compatible and a central office switch 40 that supports SF, but not ESF. In this embodiment, the DLAU's framer 12 is also employed to convert frames of data between SF and ESF format. FIG. 4 is a diagram showing a twelve-frame superframe sequence. FIG. 5 is a chart showing the ESF channel format. FIG. 6 is a diagram showing a corresponding 24-frame ESF sequence.

In particular, the framer 12 receives frames of data in ESF format from the CSU 33 over the left portion of the T1 span 21 and converts these frames into SF format. These SF frames are then transmitted over the right portion of the T1 span 22 to the central office switch 40. Going in the opposite direction, the framer 12 receives frames of data in SF format from the central office switch 40 over the right portion of the T1 span 22 and converts these frames into ESF format. These ESF frames are then transmitted over the left portion of the T1 span 21 to the CSU 30. Thus, due to the conversion function provided by the DLAU, the left portion of the T1 span and the CSU 30 can operate in extended superframe format while the right portion of the T1 span and the central office switch 40 operate in superframe format. Again, a semiconductor chip such as the BtT9170 intelligent T1 controller produced by Brooktree Corporation can be used as the framer 12 in the DLAU. In this implementation, the DLAU also provides the functions of a standard central office T1 repeater, including span power source and regeneration of the T1 signal.

Figure 3:
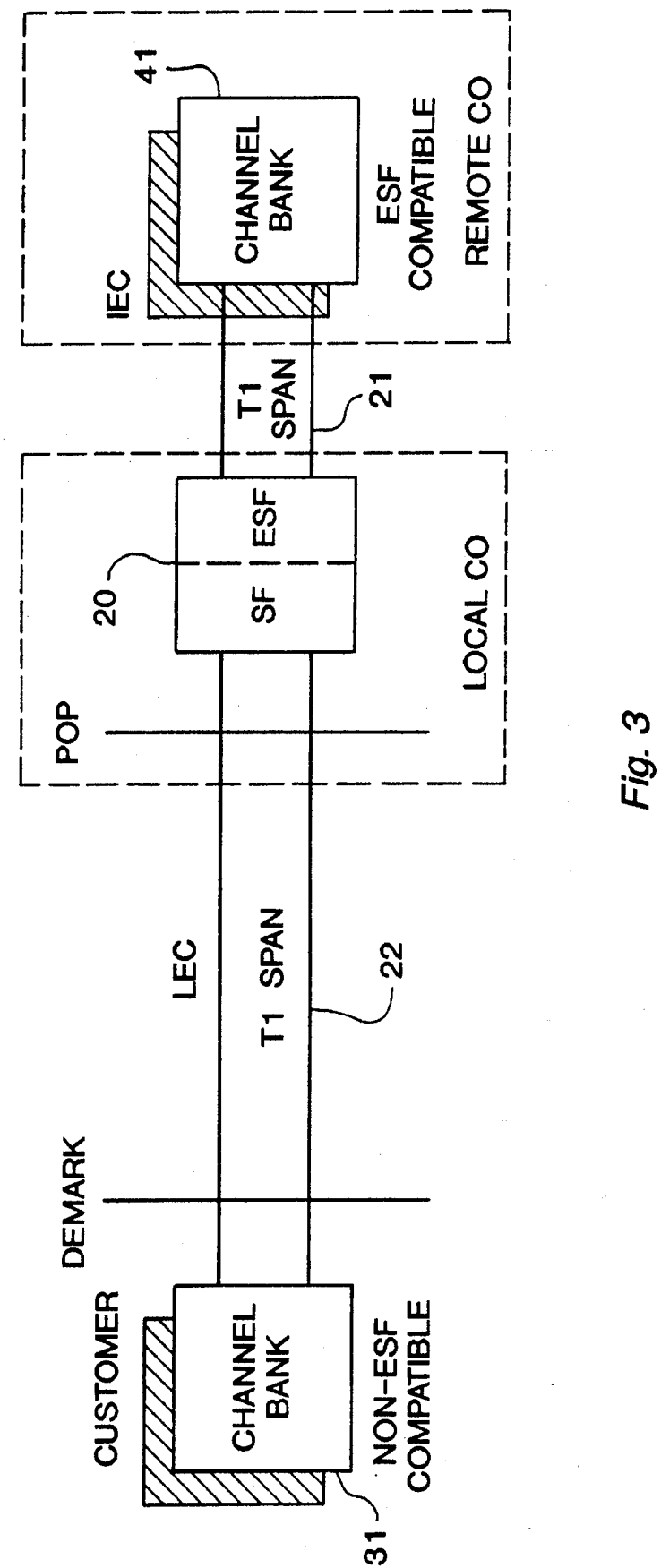
FIG. 3 is a schematic block diagram showing the data link access unit inserted into a T1 span between a customer facility that is not ESF compatible and an interexchange carrier (IEC) that is ESF compatible.

FIG. 3 shows another example of an installation of the data link access unit 20 in a T1 span 21, 22 between a customer channel bank 31 that is not ESF compatible and an interexchange carrier (IEC) channel bank 41 that is ESF compatible. This particular embodiment assumes that the DLAU 20 is located in the local telephone company central office and the IEC channel bank 41 is located in a remote central office. Here, again, the DLAU's framer chip 12 is employed to convert frames of data between SF and ESF format. The framer 12 receives frames of data in SF format from the first channel bank 31 over the left portion of the T1 span 22 and converts these frames into ESF format. These ESF frames are then transmitted over the right portion of the T1 span 21 to the second channel bank 41. Going in the opposite direction, the framer 12 receives frames of data in ESF format from the second channel bank 41 over the right portion of the T1 span 21 and converts these frames into SF format. These SF frames are then transmitted over the left portion of the T1 span 22 to the first channel bank 31. Thus, due to the conversion function provided by the DLAU, the left portion of the T1 span and the first channel bank 31 can operate in superframe format while the right portion of the T1 span and the second channel bank 41 operate in extended superframe format.

This embodiment could also be used to provide ESF/SF conversion in a T 1 span connecting two neighboring telephone operating companies where one of the operating companies has a switch that supports ESF and the other operating company's switch supports only SF. For example, a local exchange carrier (LEC, or the local telephone operating company) may want to operate an ESF circuit, but the interexchange carrier (IEC, or the long distance carrier such as AT&T) only has an SF circuit available. The reverse situation could also be true. The company desiring the performance monitoring information can install the DLAU to provide ESF for their portion of the circuit, send SF to the other company, and take off the performance data for their portion of the circuit either locally or remotely.

It should be noted that the DLAU can be inserted into a T1 span between any two network elements. For example, FIG. 3 shows the DLAU 20 inserted between two channel bank units 31 and 41. FIG. 2 shows another embodiment in which the DLAU has been inserted between a generic customer supplied unit (CSU) 30 and a generic central office switch 40. Again, both units can be conventional channel bank units. However, it should be expressly understood that equivalent network elements capable of supporting T1 communications can be substituted at either or both ends of the T1 span.

If the DLAU is inserted in a span between two network elements that are ESF compatible, the DLAU can be configured to merely monitor the data link (FDL). In this mode of operation the FDL passes throught DLAU untouched. However, the DLAU can also be configured to terminate and reinsert the FDL at the DLAU without affecting the payload.

The above disclosure sets forth a number of embodiments of the present invention. Other arrangements or embodiments, not precisely set forth, could be practiced under the teachings of the present invention and as set forth in the following claims.

We claim:

1. A data link access unit for insertion into a T1 span providing communication of frames of digital data between two network elements with at least one of said network elements communicating using extended superframe format (ESF) that provides a data link channel using specified bits in said frames of digital data, said data link access unit comprising:

a framer in said T1 span between said network elements for accessing said frames and accumulating performance data for said T1 span; and a processor for accessing said performance data.

2. The data link access unit of claim 1, wherein only a first one of said network elements communicates using ESF and the second network element communicates using superframe format (SF), and said data link access unit further comprises means for conversion of said frames between SF and ESF in said T1 span between said network elements.

3. The data link access unit of claim 1, wherein said framer communicates said performance monitoring data over said T1 span in said data link channel bits in said frames with at least one of said network elements.

4. The data link access unit of claim 1, wherein said processor further comprises a port enabling external access to said performance data.

5. The data link access unit of claim 1, wherein said processor further comprises a port enabling communication of message data through said processor and said framer over said data link channel in said frames carried by said T1 span.

6. The data link access unit of claim 1, wherein said network elements comprise channel bank units.

7. A data link access unit for insertion into a T1 span providing communication of frames of digital data between two channel bank units with at least one of said channel bank units communicating using extended superframe format (ESF) that provides a data link channel using specified bits in said frames of digital data, said data link access unit comprising:

a framer in said T1 span between said channel bank units for accessing said frames and for communicating data in said data link channel with at least one of said network elements; and a processor for communicating message data over said T1 span via said framer in said data link bits, said processor having a port for external communication of said message data.

8. The data link access unit of claim 7, wherein said framer accumulates performance data in regard to said T1 span and said processor accesses said performance data.

9. The data link access unit of claim 7, wherein said framer accumulates performance data in regard to said T1 span and communicates said performance data over said T1 span in said data link bits.

10. The data link access unit of claim 7, wherein only a first one of said channel banks communicates using ESF and the second channel bank communicates using superframe format (SF), and said data link access unit further comprises means for conversion of said frames between SF and ESF in said T1 span between said network elements.

11. A data link access unit for insertion into a T1 span providing communication of frames of digital data between a first channel bank unit communicating using superframe format (SF) and a second channel bank unit communicating using extended superframe format (ESF) that provides a data link channel using specified bits in said frames of digital data, said data link access unit comprising:

a framer in said T1 span between said channel bank units for accessing said ESF frames, for accumulating performance data on the portion of said T1 span between said data link access unit and said second channel bank unit, for communicating data in said data link channel bits in said ESF frames, for converting SF frames transmitted by said first channel bank unit into ESF frames for said second channel bank unit and for converting ESF frames transmitted by said second channel bank unit into SF frames for said first channel bank unit; and a processor for accessing said performance monitoring data, and for communicating message data with said second channel bank unit via said framer in said data link channel bits of said ESF frames.

12. The data link access unit of claim 11, wherein said processor further comprises a port enabling external access to said performance data.

13. The data link access unit of claim 11, wherein said processor further comprises a port enabling communication of message data through said processor and said framer over said data link channel bits in said frames carried by said T1 span.

* * * * *